United States Patent [19]

Naumann

[11] Patent Number: 4,492,103
[45] Date of Patent: Jan. 8, 1985

[54] APPARATUS FOR MANUFACTURING RUPTURE DISKS

[75] Inventor: Leo J. Naumann, Broken Arrow, Okla.

[73] Assignee: BS&B Safety Systems, Inc., Tulsa, Okla.

[21] Appl. No.: 602,541

[22] Filed: Apr. 20, 1984

Related U.S. Application Data

[62] Division of Ser. No. 465,799, Feb. 11, 1983, Pat. No. 4,458,516.

[51] Int. Cl.³ ............................................. B21D 22/00
[52] U.S. Cl. ........................................ 72/55; 72/325; 72/464
[58] Field of Search ................. 72/55, 325, 324, 464

[56] References Cited

U.S. PATENT DOCUMENTS

| 2,545,570 | 3/1951 | Caldwell | 72/55 |
| 3,890,819 | 6/1975 | DeLuca | 72/55 |
| 4,102,167 | 7/1978 | Wood | 72/356 |
| 4,441,350 | 4/1984 | Short | 72/55 |

Primary Examiner—Leon Gilden
Attorney, Agent, or Firm—C. Clark Dougherty, Jr.

[57] ABSTRACT

An improved apparatus for manufacturing a rupture disk containing one or more scores or perforations from a sheet metal section comprising the steps of cutting the sheet metal section into a disk, forming a concave-convex dome in the disk by applying pressurized fluid to one side thereof, and then forming one or more scores or perforations in the concave-convex dome of the disk while continuing to apply pressurized fluid thereto.

10 Claims, 18 Drawing Figures

APPARATUS FOR MANUFACTURING RUPTURE DISKS

This is a division of application Ser. No. 465,799, filed Feb. 11, 1983, now U.S. Pat. No. 4,458,516.

BACKGROUND OF THE INVENTION

1. Field of the Invention

The present invention relates generally to an apparatus for manufacturing rupture disks, and more particularly, but not by way of limitation, to an improved apparatus for manufacturing rupture disks containing one or more scores or perforations from sheet metal sections.

2. Description of the Prior Art

Many fluid pressure relief devices of the rupturable type have been developed and used heretofore. Commonly, such rupturable presssure relief device include a rupture disk supported between a pair of supporting members or flanges which are in turn connected to a relief connection in a vessel or system containing fluid pressure. When the fluid pressure within the vessel or system exceeds the design rupture pessure of the disk, rupture occurs causing excess fluid pressure to be relieved from the vessel or system.

Various types of rupture disks and rupture disk assemblies have been developed and used which fall within three general categories, i.e., those that rupture in tension known as "conventional" rupture disks, those that reverse and then rupture known as "reverse buckling" rupture disks and composites of both the conventional and reverse buckling types. Composite rupture disk assemblies generally include one or more rupture disks combined with one or more perforated members such as vacuum supports, protection members, members which tear or rupture when a primary rupture disk ruptures, etc. While some rupture disks and composite assemblies are flat, most include an annular flat flange portion to facilitate clamping between supporting members or flanges connected to a concave-convex dome portion which ruptures when excess fluid pressure is exerted on the disk. In the operation of a reverse buckling rupture disk, the fluid pressure is exerted on the convex side of the dome portion of disk, and upon failure, the dome portion reverses and then ruptures. Fluid pressure is exerted on the concave side of conventional rupture disks and the disks rupture in tension.

Metal rupture disks of both the reverse buckling type and conventional type have heretofore included one or more scores on a surface of the concave-convex portion which create lines of weakness so that upon rupture of the disk, the concave-convex portion tears along the lines of weakness and opens with little or no fragmentation of the metal. Various methods of manufacturing scored rupture disks have heretofore been developed. For example, a method of manufacturing reverse buckling scored disks is disclosed in U.S. Pat. No. 3,921,556 issued Nov. 25, 1975 and assigned to the assignee of the present invention. While such method as well as other methods have been used successfully for manufacturing scored reverse buckling rupture disks, because of deformation and stresses which are produced in the disks, a number of reforming and annealing steps have heretofore been required to produce rupture disks having desired operational characteristics. Generally, in all of the heretofore used methods of manufacturing scored or perforated rupture disks, the stresses and deformation produced when forming the scores or perforations have brought about less than optimum operational characteristics or require additional manufacturing steps.

By the present invention an improved automated apparatus is provided for manufacturing scored and perforated rupture disks of the conventional, reverse buckling and composite types wherein deformation and stresses in the disks due to the manufacturing process are reduced and all or part of the time-consuming and expensive reforming and annealing procedures previously required are eliminated.

SUMMARY OF THE INVENTION

By the present invention there is provided an improved apparatus for manufacturing a rupture disk containing one or more scores or perforations from a sheet metal section comprising the steps of cutting the section into a disk, forming a concave-convex dome in the disk by applying pressurized fluid to one side thereof, and forming the one or more scores or perforations in the concave-convex dome of the disk while continuing to apply pressurized fluid thereto.

It is, therefore, an object of the present invention to provide an improved apparatus for manufacturing rupture disks containing one or more scores or perforations from sheet metal sections.

A further object of the present invention is the provision of a therefore apparatus for manufacturing scored rupture disks, both of the conventional and reverse buckling types, wherein fewer stresses and less deformation of the metal results as a consequence of the manufacturing process.

Another object of the present invention is the provision of an apparatus for manufacturing reverse buckling scored rupture disks wherein all or at least a part of the reforming and annealing steps heretofore required for producing such disks with required operational characteristics are eliminated.

Yet another object of the present invention is the provision of automated apparatus for manufacturing rupture disks containing one or more scores or perforations.

Other and further objects, features and advantages of the present invention will be readily apparent to those skilled in the art upon a reading of the description of preferred embodiments which follows when taken in conjunction with the accompanying drawings.

DESCRIPTION OF PREFERRED EMBODIMENTS

Referring now to the drawings, and particularly to FIGS. 1-6, the automated apparatus of the present invention for manufacturing rupture disks containing one or more scores or perforations from sheet metal sections is illustrated and generally designated by the numeral 10. The apparatus 10 is formed of metal and includes a rectangular base 12 having a pair of rectangular vertical side supports 14 and 16 attached to opposite end portions thereof. A circular opening 18 is centrally positioned in the base 12 and a cylindrical pedestal 20 is attached to the base 12 over the opening 18. Positioned on opposite sides of the pedestal 20 and attached to the base 12 are conventional hydraulic cylinders 22 and 24 having vertically extending lever arms 26 and 28, respectively.

The lever arms 26 and 28 of the hydraulic cylinders 22 and 24 are rigidly attached to a rectangular platform 30. The platform 30 is of a size corresponding with the base 12 and the opposite end portions 32 and 34 of the platform 30 extend over the upper ends of the supports 14 and 16. Three spaced apart vertical guide pins 36 are attached to the end portion 32 of the platform 30 which slidably extend into complementary bores 38 disposed in the support 14. In a like manner, three vertical guide pins 40 are attached to the end portion 34 of the platform 30 which slidably extend into complementary bores 42 disposed in the support 16.

Figure 1:
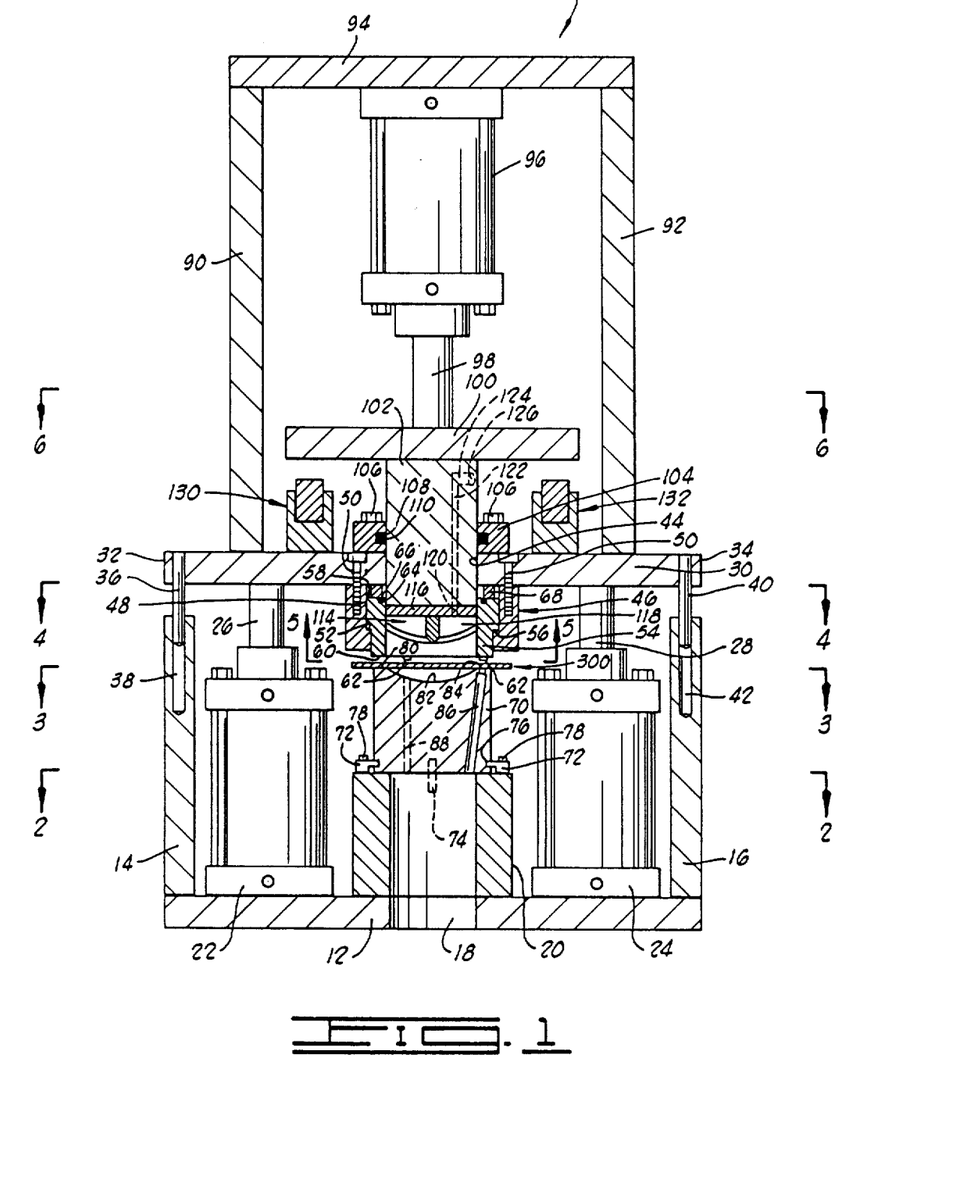
FIG. 1 is a partly sectional side elevational view of the apparatus of the present invention.
Figure 4:
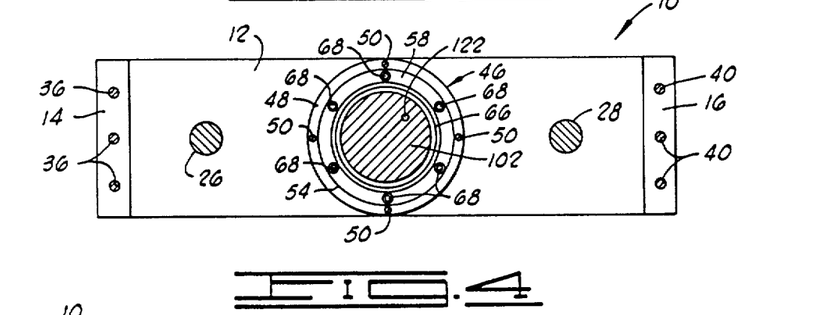
FIG. 4 is a cross-sectional view taken along line 4—4 of FIG. 1.
Figure 5:
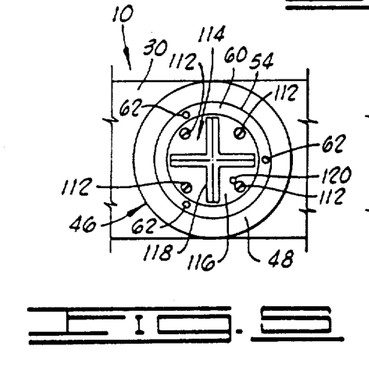
FIG. 5 is a cross-sectional view taken along line 5—5 of FIG. 1.
Figure 6:
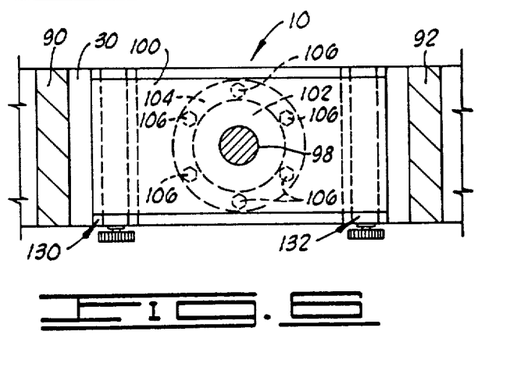
FIG. 6 is a cross-sectional view taken along line 6—6 of FIG. 1.

The platform 30 includes a circular opening 44 (FIG. 1) disposed therein, and attached to the lower side of the platform 30 around the opening 44 is a clamping and cutting assembly generally designated by the numeral 46. As best shown in FIGS. 1, 4 and 5, the assembly 46 is comprised of a fixed cylindrical cutting member 48 which is rigidly attached to the platform 30 by a plurality of cap screws 50. The cutting member 48 includes an inwardly extending flange portion at the bottom thereof forming an upwardly facing annular shoulder 52 interiorly thereof.

Slidably disposed within the cutting member 48 is a cylindrical clamping member 54 which includes an upper outwardly extending flange portion which forms a downwardly facing annular shoulder 56. The clamping member 54 is of a vertical size such that it is free to slide vertically within the cutting member 48 between a lowermost position whereby the annular shoulder 56 thereof abuts the annular shoulder 52 of the cutting member 48 and an uppermost position whereby the upper annular end 58 of the clamping member 54 abuts the lower side of the platform 30. The lower annular end 60 of the clamping member 54 includes at least two and preferably three downwardly extending locating hole punches 62 spaced in predetermined relationship thereon.

As shown in FIGS. 1 and 4, the upper annular end 58 of the clamping member 54 includes an annular recess 64 formed therein within which a conventional 0-ring 66 is disposed. In addition, a plurality of springs 68 are positioned in complementary opposing recesses formed in the ends 58 of the clamping member 54 and the platform 30. The springs 68 urge the clamping member 54 to its lowermost position with respect to the cutting member 48 as illustrated in FIG. 1.

Figure 2:
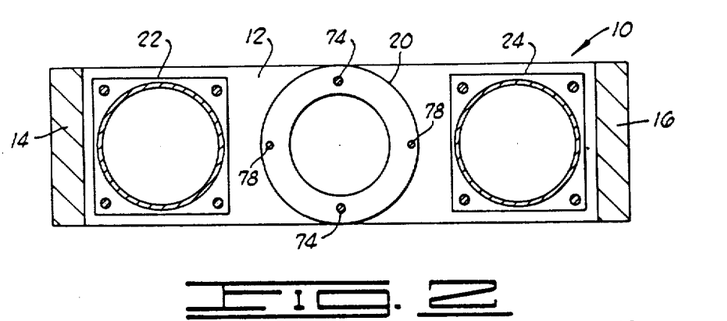
FIG. 2 is a cross-sectional view taken along line 2—2 of FIG. 1.
Figure 3:
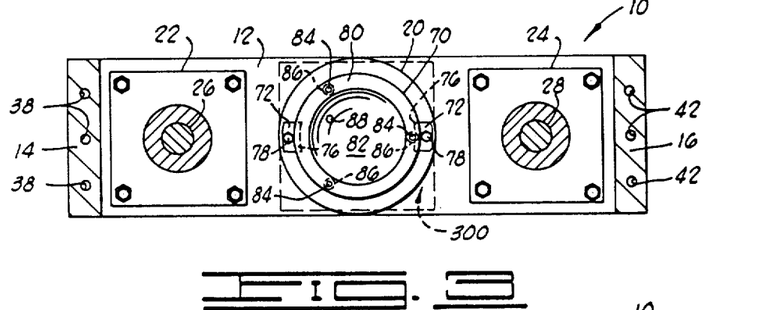
FIG. 3 is a cross-sectional view taken along line 3—3 of FIG. 1.

Removably positioned on top of the cylindrical pedestal 20 is a cylindricl rupture disk forming die 70. As shown in FIGS. 1, 2 and 3, the cylindrical die 70 is removably held in alignment with the clamping and cutting assembly 46 on the pedestal 20 by a pair of clips 72 and a pair of alignment pins 74. The alignment pins 74 are attached to the bottom face of the die 70 and extend into complementary bores disposed in the pedestal 20. The clips 72 include tongue portions 76 which extend into complementary grooves in the die 70 and the clips 72 are held to the pedestal 20 by bolts 78.

The upper face of the die 70 has a forming configuration comprised of an outer annular flat poriton 80 (FIGS. 1 and 3) surrounding an inner dish-shaped recess 82. Disposed in the annular flat portion 80 of the die 70 are three openings 84 of complementary position and size with the locating hole punches 62 of the clamping member 54. The openings 84 communicate with enlarged passageways 86 which extend from the openings 84 downwardly through the die 70 to the bottom face thereof where they communicate with the central opening in the cylindrical pedestal 20 which in turn communicates with the opening 18 in the base 12. Another passage 88 is disposed verrtically through the die 70 from the recess 82 to the bottom face thereof whereby the recess is communicated with the opening in the cylindrical pedestal 20.

Attached to the top of the platform 30 are a pair of spaced apart vertically positioned rectangular support members 90 and 92. The top ends of the support members 90 and 92 are in turn attached to a horizontally positioned rectangular support member 94. A hydraulic cylinder 96 is attached to the bottom side of the memberr 94 whereby the lever arm 98 of the cylinder 96 extends vertically downwardly. Attached to the arm 98 is a horizontally positioned rectangular striker plate 100 (FIGS. 1 and 6) and attached to the bottom side of the plate 100 is a vertically positioned elongated cylindrcal ram 102 (FIGS. 1 and 4) which slidably extends through the circular opening 44 in the platform 30.

An annular seal unit 104 is bolted to the top surface of the platform 30 around the opening 44 therein by a plurality of bolts 106. The seal unit 104 includes an annular recess 108 positioned adjacent the outside surface of the cylindrical ram 102 and a conventional 0-ring 110 is disposed in the recess 108.

As shown in FIGS. 1 and 5, attached to the downwardly facing circular end of the ram 102 by a plurality of cap screws 112 is a score forming blade assembly 114 which includes a circular base member 116 to which a blade member 118 of cross configuration is attached. The base member 116 includes a vertical passage 120 extending therethrough which aligns and communicates with a vertical passage 122 in the cylindrical ram 102. The vertical passage 122 intersects and communicates with a horizontal passage 124 which extends through a side of the ram 102 and is threaded for receiving a conventional fitting to which a hose is attached (not shown).

Referring now specifically to FIGS. 1, 6, 7 and 8, a pair of microbar assemblies 130 and 132 are attached to the platform 30 on opposite sides of the ram 102 and are positioned parallel to each other and to the ends of the striker plate 100. The microbar assemblies 130 and 132 function in combination with the striker plate 100 to limit the downward movement of the ram 102 and blade assembly 114 attached thereto.

Figure 7:
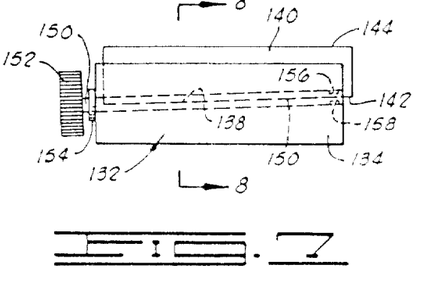
FIG. 7 is a side view of a portion of the apparatus of FIG. 1.
Figure 8:
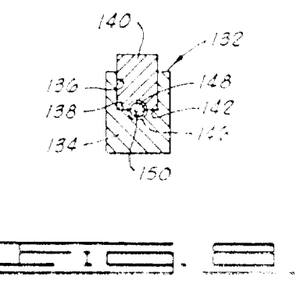
FIG. 8 is a cross-sectional view taken along line 8—8 of FIG. 7.

The microbar assemblies 130 and 132 are identical and the following description of the assembly 132 applies equally to the assembly 130. As best shown in FIGS. 7 and 8, the microbar assembly 132 is comprised of a base member 134 which includes an upwardly facing rectangular recess 136 extending over its entire length. The bottom surface 138 of the recess 136 is inclined with respect to the membe 134 and an elongated substantially rectangular bearing member 140 is disposed in the recess 136 of the base member 134. The bottom surface 142 of the member 140 which is in contact with the bottom surface 138 of the recess 136 is inclined similarly to the surface 138 whereby the top 144 of the member 140 remains parallel to the bottom of the base member 134 when the member 140 is moved laterally with respect to the base member 134. However, as will be understood, when the member 140 is moved to the right with respect to the base member 134, the distance between the top surface 144 thereof and the bottom of the base member 134 increases. Conversely, when the member 140 is moved to the left with respect to the base member 134, the distance between the surface 144 thereof and the bottom of the base member 134 is decreased.

Semicircular laterally extending grooves 146 and 148 are disposed in the adjcent surfaces 138 and 142 of the base member 134 and bearing member 140, respectively, and the groove 148 includes threads while the groove 146 does not. A threaded shaft 150 is disposed within the semicircular grooves 146 and 148, the threads of which engage the threads of the groove 148, and a knob 152 for rotating the shaft 150 is attched to one end thereof. The shaft 150 is prevented from moving with respect to the base member 134 by a flange portion 154 at one end thereof and a continuous annular recess 156 at the other end thereof into which a protuberance 158 in the semicircular groove 146 of the member 134 extends. As will now be apparent, when the shaft 150 is rotated by rotating the knob 152, the member 140 is moved laterally either increasing or decreasing the overall height of the assembly 132.

Figure 9:
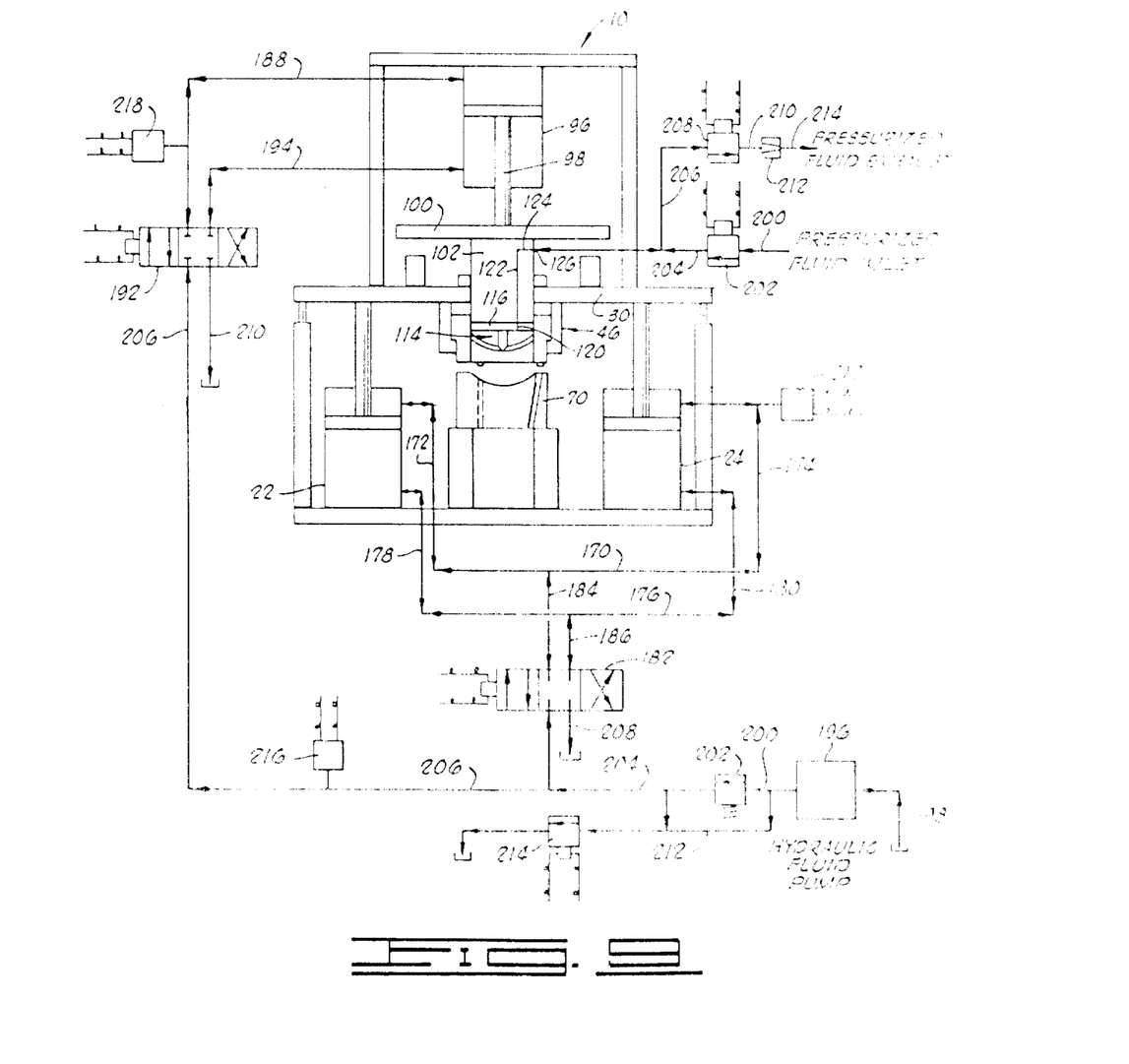
FIG. 9 is a schematic view of the apparatus of FIG. 1 including the hydraulic circuits, valves and other equipment which are a part of the apparatus.

Referring now to FIG. 9, the apparatus 10 is schematically illustrated in conjunction with the hydraulic fluid conduits, valves, controls and pump for operating the hydraulic cylinders 22, 24 and 96 and with the conduits and valves for causing pressurized fluid to flow through and be exhausted from the passages 122 and 124 of the ram 102 and the passage 120 of the blade assembly 114. More specifically, the upperr hydraulic fluid ports of the hydraulic cylinders 22 and 24 are communicated with a header 170 by conduits or hoses 172 and 174, respectively. The lower ports of the cylinders 22 and 24 are communicated wth a header 176 by conduits or hoses 178 and 180, respectively. The headers 170 and 176 are communicated with the ports of a conventional solenoid operated hydraulic control valve 182 by conduits 184 and 186, respectively.

The upper port of the hydraulic cylinder 96 is connected by a conduit or hose 188 to a port of a conventional solenoid operated hydraulic fluid control valve 192. The lower port of the cylinder 96 is connected to another port of the control valve 192 by a conduit 194.

A conventional hydraulic fluid pump 196 is provided the inlet connection of which is connected by a conduit 198 to a hydraulic fluid accumulator and return system (not shown, but designated by the symbol ⊔). The discharge of the pump 196 is connected by a conduit 200 to a conventional hydraulic fluid pressure regulator 202, and a conduit 204 leads hydraulic fluid from the pressure regulator 202 to the hydraulic fluid inlet port of the valve 182. A conduit 206 connected to the conduit 204 leads hydraulic fluid to the inlet port of the valve 192.

A conduit 208 connects a port of the valve 182 to the hydraulic fluid return system and a conduit 210 connects a port of the valve 192 to the return system. A conduit 212 is connected to the conduit 200 and to the return system, and a solenoid operated valve 214 is disposed in the conduit 212. Conventional hydraulic fluid pressure switches 216, 217 and 218 are connected to the conduits 206, 174 and 188, respectively.

A conduit 200 leads pressurized fluid, such as pressurized air, from a source thereof to a solenoid operated valve 202. A conduit or hose 204 leads the pressurized fluid from the valve 202 to the opening 126 in the ram 102 which is communicated with the passages 122, 124 and 120 previously described. A conduit or hose 206 is connected to the conduit or hose 204 and to a solenoid operated shutoff valve 208. The valve 208 is in turn connected by a conduit 210 to a flow restrictive orifice assembly 212. The assembly 212 is in turn communicated to the atomsphere or a vent by a conduit 214.

OPERATION OF THE APPARATUS 10

As will be understood by those skilled in the art, the operation of the apparatus 10 is controlled by a conventional electric control system which can in turn be operated manually or operated by a computer, etc. The electric control system operates the solenoids of the hydraulic control valves and the other valves described herein which in turn control the operation of the hydraulic cylinders 22, 24 and 96 and the application of pressurized fluid or the exhausting thereof. More specifically, the apparatus 10 is ready to commence the manufacture of a scored or perforated rupture disk from a sheet metal section as it is shown in FIGS. 1 and 9. More specifically, referring to FIG. 9 hydaulic fluid is pumped from the hydraulic fluid return and accumulator system by the pump 196 through the conduit 198 and into the conduit 200. The conduit 200 leads the hydraulic fluid to the pressure regulator 202 which controls the hydraulic fluid pressure at a predetermined level. From the pressure regular 202, hydraulic fluid flow by way of the conduit 204 to the control valve 182 which routes the hydraulic fluid by way of the conduit 186 through the header 176 and the conduits 178 and 180 into the lower ports of the cylinders 22 and 24 which cause the platform 30 and the apparatus attached thereto to be moved upwardly away from the die 70. The upper ports of the cylinders are communicated by the conduits 172 and 174, the header 170 and the conduit 184 to the hydraulic fluid return system by way of the valve 182 and the conduit 208.

In a like manner, hydraulic fluid flowing to the control valve 192 by way of the conduit 206 connected thereto is routed to the lower port of the hydraulic cylinder 96 by way of the conduit 194 and hydraulic fluid is exhausted from the upper port thereof by way of the conduit 188, the valve 192 and the conduit 210 to the return system which causes the plate 100 and ram 102 to be moved upwardly by the hydraulic cylinder 96.

The manufacturing process is begun by placing a substantially square sheet metal section 300 (FIGS. 1 and 3) on the rupture disk forming die 70, i.e., on the upwardly facing forming face of the die 70. As will be understood, the sheet metal section 300 is generally cut from a larger sheet, it is flat and it can be formed of any of a variety of metals depending upon the particular application in which the rupture disk manufactured therefrom is to be used. Generally, the particular metal used and the thickness thereof are predetermined by prior experience or by trial and error.

After placing the sheet metal section 300 on the rupture disk forming face of the die 70, the hydraulic fluid control valve 182 is reversed whereby hydraulic fluid flows from the valve 182 through the conduit 184, through the header 170 and through the conduits 172 and 174 into the hydraulic cylinders 22 and 24 by way of the upper ports thereof. This in turn causes the pistons within the hydraulic cylinders to move downwardly and hydraulic fluid to flow from the cylinders 22 and 24 by way of the lower ports therein, the conduits 178 and 180, the header 176 and the conduit 186 to the valve 182 and into the hydraulic fluid return system by way of the conduit 208.

Figure 10:
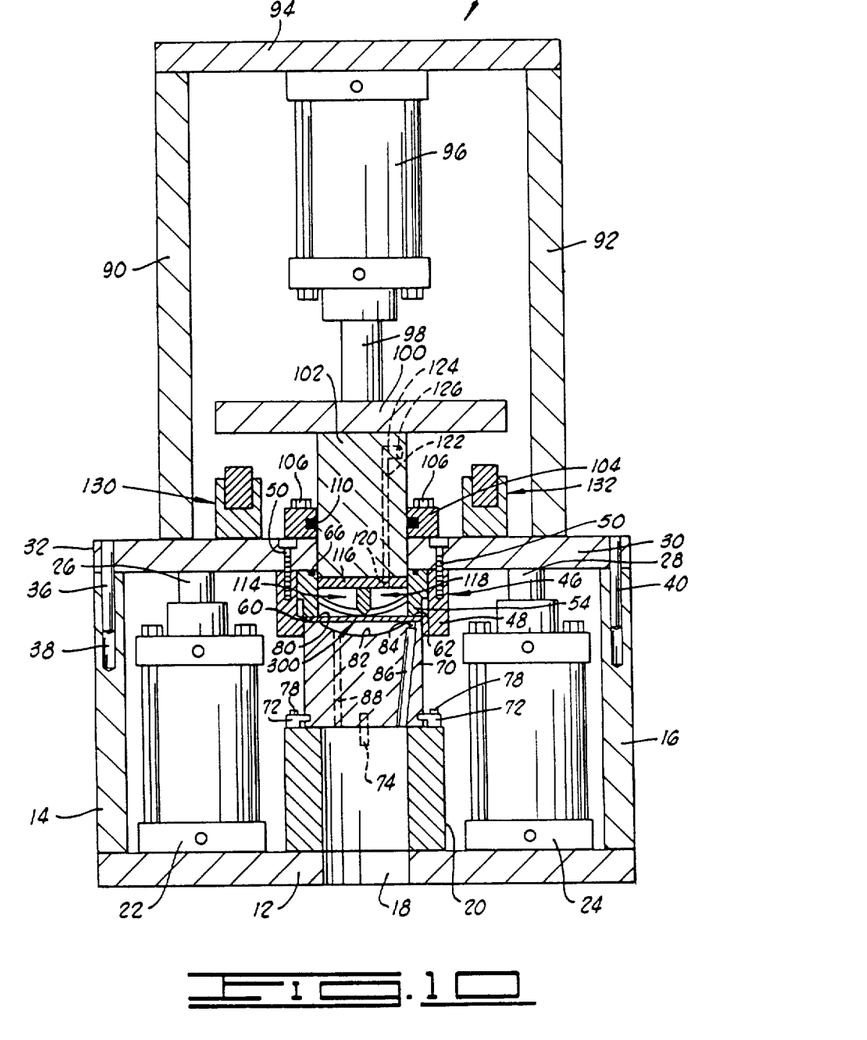
FIG. 10 is a partly sectional side elevational view of the apparatus of the present invention which is similar to FIG. 1 except that a sheet metal section has been clamped in the apparatus and cut into a disk.

The downward movement of the pistons within the hydraulic cylinders 22 and 24 moves the lever arms 26 and 28 thereof and the platform 30 attached thereto downwardly. The platform 30 is maintained in proper alignment by the guide posts 36 and 40 which move downwardly within the bores 38 and 42 in the support members 14 and 16. As the platform 30 moves downwardly, the clamping and cutting assembly 46 moves towards the die 70 and the sheet metal section 300 positioned thereon. The three punches 62 (FIG. 1) extending from the annular face 60 of the clamping member 54 first come into contact with the sheet metal section 300 as the assembly 46 moves downwardly and the punches 62 punch locating holes in the section 300. The circular metal parts punched from the section 300 when the locating holes are formed therein drop through the passages 86 in the die 70 and through the interior of the pedestal 20 and the opening 18 in the base 12. As the platform 30 and the assembly 46 continue to move downwardly, the annular clamping face 60 of the clamping member 54 contacts the sheet metal section 300 and rigidly clamps it aginst the annular flat portion 80 of the forming face of the die 70. The continued downward movement of the platform 30 causes the springs 68 between the clamping member 54 and platform 30 to be compressed and the cutting member 48 to continue its movement towards the die 70. The external diameter of the cylindrical die 70 is slightly less than the internal diameter of the cylindrical cutting member 48 so that when the bottom face of the cutting member 48 contacts the portions of the sheet metal section 300 overlapping the periphery of the forming face of the die 70, the continued downward movement of the cutting member 48 causes the overlapping portions of the section member 48 to be sheared therefrom. When the hydraulic cylinders 22 and 24 have moved the platform 30 to its lowermost position, the clamping face 60 of the clamping member 54 is positioned against the section 300 which is in turn clamped against the flat annular portion 80 of the forming face of the die 70. In addition, the lower portion of the cutting member 48 overlaps an upper portion of the die 70, all as shown in FIG. 10.

The hydraulic fluid pressure switch 217 (FIG. 9) attached to the conduit 174 senses the pressure of the hydraulic fluid exerted within the cylinders 22 and 24, and when such pressure reaches a predetermined level thereby indicating that the section 300 is rigidly clamped between the clamping member 54 of the assembly 46 and the die 70 and that the cutting member 48 has been moved downwardly whereby the section has been cut into a disk, the pressure switch 217 closes or otherwise sends an electric signal to the electric control system whereby the second phase of the manufacturing operation is commenced.

Figure 11:
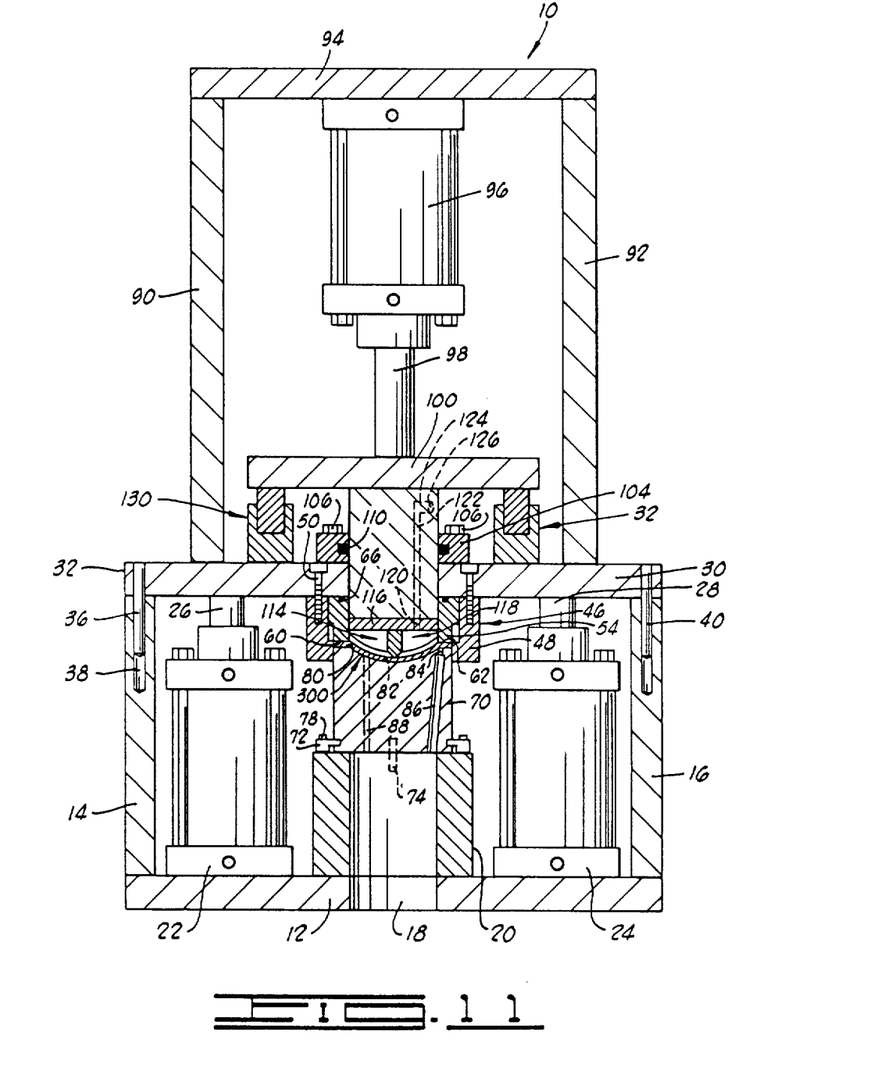
FIG. 11 is a partly sectional side elevational view of the apparatus of the present invention which is similar to FIG. 10 except that the sheet metal section has been formed and scored by the apparatus.

The second phase of the manufacturing operation involves forming a concave-convex dome in the section 300 which has previously been cut into a disk. This is accomplished by the opening of the valve 202 (FIG. 9) whereby pressurized fluid, preferably pressurized air, is caused to flow from a source thereof by way of the conduit 200, through the valve 202 and the conduit 204, through the passages 122 and 124 in the ram 102 and through the passage 120 in the plate 116 of the blade assembly 114. Referring now to FIG. 11, the 0-ring 66 provides a seal between the top fce of the clamping member 54 and the bottom surface of the platform 30 and the 0-ring 110 provides a seal between the member 104 and the outside surface of the ram 102. Thus, the space between the top surface of the sheet metal disk 300 and the plate 116 of the blade assembly 114 is sealed and the pressurized fluid flowing into the space by way of the passage 120 creates a force on the top side of the disk 300. The pressurized fluid forces the disk 300 downwardly against the surface of the dish-shaped recess 82 in the forming face of the die 70 as shown in FIG. 11. The passage 88 in the die 70 allows air trapped between the bottom surface of the sheet metal disk 300 and the surface of the recess 82 to escape as the disk is forced against and conformed to the forming face of the die 70 whereby a concave-convex dome is formed therein.

Referring again to FIG. 9, after the pressurized fluid has been applied to the sheet metal disk 300 for a predetermined period of time, the valve 202 is shut off and the valve 208 is opened whereby pressurized fluid within the space between the blade assembly 114 and sheet metal disk 300 is exhausted by way of the passages 120, 122 and 124, the conduit 204, the conduit 206, the valve 208, the conduit 210, the orifice assembly 212 and the conduit 214. However, because the orifice 212 restricts the flow of pressurized fluid therethrough, the fluid pressure exerted on the sheet metal disk 300 within the apparatus 10 is exhausted therefrom slowly.

While fluid pressure is being applied to the disk 300, the hydraulic control valve 192 is activated whereby hydraulic fluid flows by way of the conduit 206 to the valve 192 and through the conduit 188 into the top port of the hydraulic cylinder 96. This causes the piston within the cylinder 96 to move downwardly which in turn causes hydaulic fluid to flow through the lower port of the cylinder, through the conduit 194, through the valve 192 and into the hydraulic fluid return system by way of the conduit 210. As the lever arm 98 of the cylinder 96 moves downwardly, the plate 100 and ram 102 attached thereto also moved downwardly whereby the blade assembly 114 attached to the ram 102 forceably contacts and forms scores in the concave-convex dome portion of the disk 300 as shown in FIG. 11.

Prior to forming the disk 300, the microbar assemblies 130 and 132 are each adjusted in height so that the desired depth of score is formed in the disk 300 and the blade assembly 114 is prevented from being damaged. That is, the bottom surface of the plate 100 contacts the microbar assemblies 130 and 132 immediately after the blade assembly 114 contacts the disk 300 whereby scores of desired depth are formed on the disk 300 and the blade assembly is prevented from moving downwardly too far whereby it forceably contacts the die 70 and damages the die 70 or the blades 118. When the apparatus 10 is utilized to form rupture disks with perforations therein, i.e., the blade assembly attached to the ram 102 perforates the disk, the microbar assemblies 130 and 132 are set such that the blades of the blade assembly perforate the disk but do not contact the forming face of the die 70 in a manner whereby damage to the die or the blade assembly results. As previously described, the height of the microbar assemblies 130 and 132 is adjusted by rotating the knobs 152 and shafts 150 (FIGS. 7 and 8) whereby the members 140 are moved laterally with respect to the base members 132 thereof.

After the scores have been formed in the disk 300, the blade assembly 114 is maintained in forceable contact with the concave-convex dome portion of the disk 300 for a period of time, i.e., for a predetermined "dwell time". The pressure switch 218 (FIG. 9) attached to the conduit 188 senses the hydraulic fluid pressure in the top portion of the cylinder 96, and when the pressure reaches a predetermined level the hydraulic fluid flow into the cylinder is stopped to thereby control the maximum score blade force exerted on the disk 300.

The hydraulic control valves 182 and 192 are next activated whereby the flow of hydraulic fluid to the cylinders 22, 24 and 96 is reversed and the platform 30 as well as the ram 102 and plate 100 are moved upwardly to their uppermost positions. The rupture disk 300 formed by the apparatus 10 having the shape and form illustrated in FIGS. 12 and 13 is removed from the apparatus 10 and replaced with a new flat sheet metal section whereupon the manufacturing process is repeated to form another rupture disk, etc.

Referring once again to FIG. 9, the pressure switch 216 senses the hydraulic fluid pressure in the system downstream of the pressure regulator 202. If the pressure becomes too high for any reason, i.e., above a predetermined set point, the switch 216 closes and causes the valve 214 to open whereby pressure is relieved from the system. Other safety controls which will suggest themselves to those skilled in the art can also be used in the apparatus 10.

Figure 12:
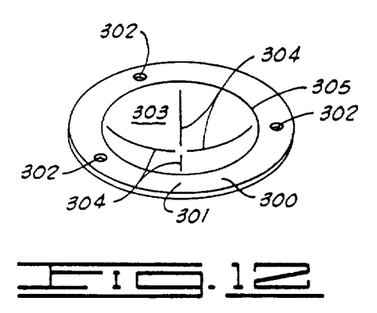
FIG. 12 is a perspective view of a scored rupture disk manufactured in accordance with the present invention.
Figure 13:
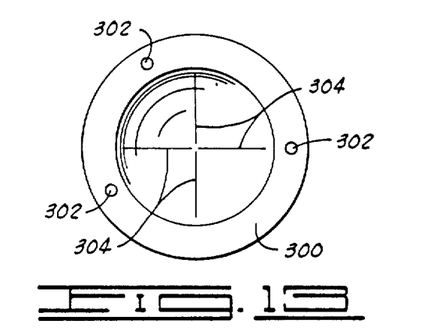
FIG. 13 is a top plan view of the rupture disk of FIG. 12.

As shown in FIGS. 12 and 13, the rupture disk 300 produced includes an annular flat flange portion 301 connected to a concave-convex dome portion 303 by an annular transistion connection 305. The annular flat flange poriton 301 includes three locating holes 302 for receiving locating pins which are positioned in a predetermined pattern whereby the disk 300 cannot be installed upside down and the concave-convex portion 303 includes four scores 304 positioned in a cross pattern whereby the scores extend radially outwardly from a central portion to the periphery of the dome portion.

Figure 14:
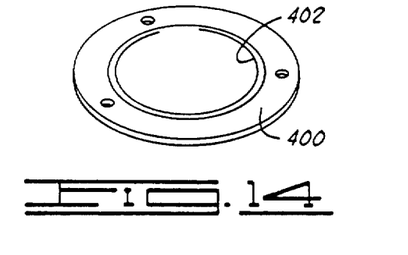
FIG. 14 is a perspective view of a scored rupture disk having a different score pattern formed thereon than that shown in FIGS. 12 and 13.

As will be understood, both the rupture disk forming die 70 and the score forming blade assembly 114 can be removed from the apparatus 10 and replaced with other rupture disk forming dies and score or perforation forming blades to produce rutpure disks or different configurations containing different score or perforation patterns. For example, as shown in FIG. 14, a rupture disk 400 having the same configuration as the rupture disk 300 can be produced except that instead of cross score pattern formed by four straight line scores, the rupture disk 400 includes a single score 402 forming a partial circle in the concave-convex dome portion thereof.

Figure 15:
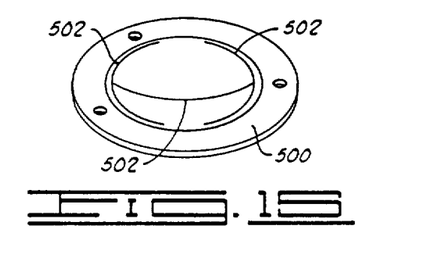
FIG. 15 is a perspective view of a scored rupture disk having yet another score pattern formed thereon.

A rupture disk 500 having yet another score pattern formed in the concave-convex dome portion thereof is illustrated in FIG. 15. That is, the rupture disk 500 contains three scores 502 which form a pattern comprised of two opposing arcs of a circle connected at intermediate points by a straight line score.

Figure 16:
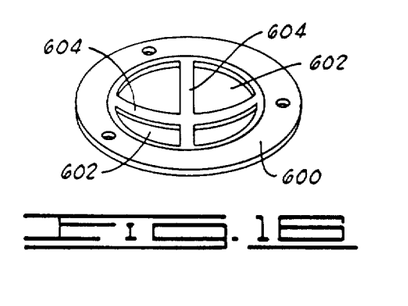
FIG. 16 is a perspective view of one form of rupturable support member including perforations which can be manufactured in accordance with the present invention.

FIG. 16 illustrates a perforated rupturable member 600 which can be formed by the apparatus 10 having a concave-convex dome portion which includes perforations 602 formed therein, i.e., triangular cut-outs whereby crossing straps 604 remain.

Figure 17:
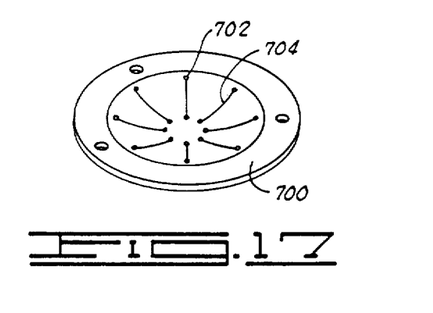
FIG. 17 is a perspective view of an alternate form of rupturable member including perforations.

FIG. 17 illustrates an alternate form of perforated rupturable member wherein the perforations form a plurality of apertures 702 connected by slits 704 extending radially outwardly from a central portion of the concave-convex dome portion of the disk to the periphery thereof.

Figure 18:
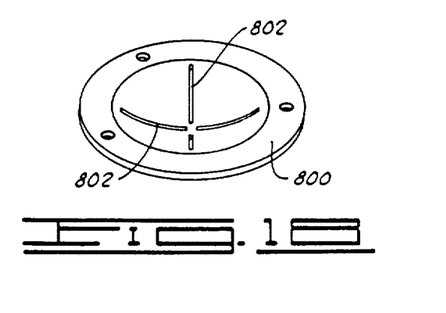
FIG. 18 is a perspective view of yet another form of rupturable member.

FIG. 18 illustrates yet another form of perforated rupturable member 800 wherein the perforations are in the form of four slits 802 extending radially outwardly from a central portion of the disk.

A variety of other rupture disks, rupturable members, vacuum supports and other disk products can be produced in accordance with the method of the present invention utilizing the apparatus 10.

In forming all of the variety of disk products which can be formed with the apparatus 10, a concave-convex dome is first formed in a sheet metal disk by applying pressurized fluid to one side thereoff followed by forming the scores or perforations in the concave-convex dome of the disk while continuing to apply pressurized fluid therreto. This is accomplished in the apparatus 10 by forceably contacting the concave-convex dome of the disk 300 with the blade assembly 114 (FIG. 11) prior to or immediately upon the opening of the valve 208 which exhausts the pressurized fluid from the apparatus 10. Because of the orifice assembly 212 or other equivalent flow restriction means in the pressurized fluid exhaust flow path, pressurized fluid remains in the apparatus 10 after the scores or perforations are formed on the rupture disk being produced. This in turn reduces the stresses produced in the disk by the scoring or perforating. In addition, after the blade assembly attached to the ram 102 is brought into forceable contact with the rupture disk being produced to form the scores or perforations therein, the blade is preferably maintained in forceable contact with the disk for a predetermined dwell time. This again reduces the stresses formed in the disk and allows the metal of the disk to become well settled in its new shape before the various forces exerted on it are removed.

Because the scores or perforations formed in the disk are formed while fluid pressure is maintained on the disk and because the score or perforation forming blade is meaintained in forceable contact with the disk for a dwell time, the rupture disks produced by the method of this invention in the apparatus 10 have fewer stresses therein and generally do not require annealing to relieve stresses. This reduction or elimination of the requirement for annealing reduces the manufacturing cost of the rupture disks produced and allows rupture disks to be produced which are formed of metals which could not heretofore be utilized because they could not be annealed. Examples of such metals are silver, tantalum, titanium and platinum.

The blade assembly of the apparatus 10 forms all of the scores or perforations produced in the rupture disks being manufactured at one time, which makes the score or perforations more uniform in depth, width and other characteristics and the scores or perforations are more precise in configuraiton and orientation than those formed using period manufacturing methods, all of which brings about a superior rupture disk product. In addition, because of the use of the microbar assemblies 130 and 132 in combination with the rest of the apparatus 10, more precise control of variables can be accomplished which in turn brings about the manufacture of rupture disks having better operational characteristics than heretofore possible.

Thus, the apparatus of the present invention is well adapted to carry out the objects and attain the ends and advantages mentioned as well as those inherent therein. While presently preferred embodiments of the invention have been described for purposes of this disclosure, numerous changes can be made in the construction and arrangement of parts, which changes are encompassed within the spirit of this invention as defined by the appended claims.

What is claimed is:

1. Apparatus for manufacturing scored or perforated rupture disks from sheet metal sections comprising:

a base;

a rupture disk forming die removably attached to said base;

means for sealingly clamping a sheet metal section to said die and cutting said section into a disk movably positioned adjacent said die;

means for applying pressurized fluid to a sheet metal disk whereby said disk is forced against and conformed to said die attached to said clamping and cutting means;

means for selectively moving said clamping and cutting means into and out of clamping and cutting contact with a sheet metal section attached to said base and to said clamping and cutting means;

a movable ram having a score or perforation forming blade attached thereto sealingly attached to said clamping and cutting means and positioned to move said blade into forceable contact with a sheet metal disk forced against and conformed to said die whereby scores or perforations are formed on or in said disk; and means for selectively moving said ram attached thereto and to said clamping and cutting means.

2. The apparatus of claim 1 wherein said rupture disk forming die has a forming configuration such that when said sheet metal disk is forced against and conformed to said die, said disk is formed into a central concave-convex dome connected to an annular flat flange.

3. The apparatus of claim 1 wherein said means for selectively moving said clamping and cutting means and said means for selectively moving said ram are hydraulic cylinders.

4. The apparatus of claim 2 which is further characterized to include means for punching at least two locating holes in the annular flat flange portion of said disk attached to said clamping and cutting means.

5. The apparatus of claim 2 wherein said score or perforation forming blade is of a size such that scores or perforations are formed on the central concave-convex dome portion of said disk.

6. The apparatus of claim 5 wherein said score or perforation forming blade is a score forming blade and is of a configuration such that a circular score is formed on said disk.

7. The apparatus of claim 5 wherein said score or perforation forming blade is of a configuration such that at least one score or perforation which radiates outwardly from a central portion of said concave-convex dome to the periphery thereof is formed on or in said disk.

8. The apparatus of claim 2 wherein said rupture disk forming die includes a circular forming face having a flat annular portion surrounding a concave recess portion.

9. The apparatus of claim 8 wherein said score or perforation forming blade is convex.

10. The apparatus of claim 1 wherein said means for applying pressurized fluid comprise:

a pressurized fluid passageway disposed in said ram; and conduit means connected to said passageway and to a source of pressurized fluid.

* * * * *

UNITED STATES PATENT AND TRADEMARK OFFICE
CERTIFICATE OF CORRECTION

PATENT NO. : 4,492,103
DATED : January 8, 1985
INVENTOR(S) : Leo J. Naumann

It is certified that error appears in the above-identified patent and that said Letters Patent are hereby corrected as shown below:

Column 1, line 19, change "device" to --devices--.

Column 2, line 28, delete the word "therefore".

Column 4, line 24, change "cylindricl" to --cylindrical--.
Column 4, line 35, change "poriton" to --portion--.
Column 4, line 46, change "verrtically" to --vertically--.
Column 4, line 56, change "berr" to --ber--.

Column 5, line 53, change "attched" to --attached--.

Column 9, line 67, change "transistion" to --transition--.

Column 10, line 11, change "rutpure" to --rupture--.
Column 10, line 10, change "or" to --of--.
Column 10, line 15, between "of" and "cross" insert --a--.
Column 10, line 48, change "thereoff" to --thereof--.
Column 10, line 51, change "therreto" to --thereto--.

Column 11, line 6, change "meaintained" to --maintained--.
Column 11, line 23, change "period" to --prior--.

Signed and Sealed this

Eighteenth Day of June 1985

[SEAL]

Attest:

DONALD J. QUIGG

Attesting Officer

Acting Commissioner of Patents and Trademarks